United States Patent [19]

Satterfield

[11] Patent Number: 4,955,516

[45] Date of Patent: Sep. 11, 1990

[54] PORTABLE BEVERAGE CARRIER

[76] Inventor: Gary T. Satterfield, 659 E. 8th St., Upland, Calif. 91786

[21] Appl. No.: 381,806

[22] Filed: Jul. 19, 1989

[51] Int. Cl.[5] ............................................. B62J 9/00
[52] U.S. Cl. .................................. 224/35; 224/32 R; 224/42.11; 224/901; 62/457.2; 62/457.4; 62/457.5
[58] Field of Search ............ 224/35, 901, 32 R, 42.11, 224/36; 220/85 H; 62/457.2, 457.4, 457.5

[56] References Cited

U.S. PATENT DOCUMENTS

| | | | |
|---|---|---|---|
| 1,485,067 | 2/1924 | Bristol . | |
| 3,741,429 | 6/1973 | Purcell et al. . | |
| 3,840,153 | 10/1974 | Devlin | 224/32 R |
| 3,970,229 | 7/1976 | Norinsky | 224/35 |
| 4,079,767 | 3/1978 | Howard | 224/901 |
| 4,266,407 | 5/1981 | Gibson . | |
| 4,282,279 | 8/1981 | Strickland | 224/32 R |
| 4,295,345 | 10/1981 | Atkinson . | |
| 4,324,111 | 4/1982 | Edwards | 62/457.4 |
| 4,386,721 | 6/1983 | Shimano . | |
| 4,418,733 | 12/1983 | Kallman | 224/901 |
| 4,802,602 | 2/1989 | Evans et al. | 220/85 H |

Primary Examiner—Linda J. Sholl
Attorney, Agent, or Firm—Jerry T. Kearns

[57] ABSTRACT

A portable beverage carrier adapted for mounting on a horizontal top frame tube of a bicycle includes a pair of insulated receptacles, each dimensioned to receive one or a plurality of standard beverage containers. The insulated receptacles each include a zipper fastened cover. The covers and receptacles are each formed from a fabric material lined with a gel refrigerant encapsulated within a water proof liner. An elongated strap has opposite ends secured to each of the receptacles and first cooperating hook and loop fasteners are provided for securing the strap to a bicycle top frame tube. Second cooperating hook and loop fasteners are provided on facing portions of the opposite ends of the strap for securing the strap around the top bicycle frame tube. The portable beverage carrier allows soft drinks and fruit juices to be carried at an accessible central location near the center of gravity of a bicycle.

1 Claim, 3 Drawing Sheets

PORTABLE BEVERAGE CARRIER

BACKGROUND OF THE INVENTION

1. Field of the Invention

The present invention relates to portable beverage carriers, and more particularly pertains to a portable beverage carrier for transporting standard beverage containers on a bicycle. The conventional form of bicycle beverage carrier consists of a bicycle frame mounted wire rack dimensioned to frictionally engage an inserted plastic bottle. These conventional bicycle beverage carriers are uninsulated and are thus incapable of maintaining a beverage cold. Additionally, these conventional plastic bicycle beverage bottles tend to add a plastic flavor to water transported therein. Because the plastic bottles are unsealed, there is a risk of contaminating the bottle contents, as the bottles are typically left on the bicycle for protracted periods. In order to overcome these problems, the present invention provides an easily installed insulated carrier which utilizes a refreezable gel refrigerant to store conventional beverage containers in a chilled environment.

2. Description of the Prior Art

Various types of portable beverage carriers are known in the prior art. A typical example of such a portable beverage carrier is to be found in U.S. Pat. No. 1,485,067, which issued to L. Bristol on Feb. 26, 1924. This patent discloses a balanced bag adapted for securement over the horizontal top frame portion of a bicycle. A pair of strap members are provided for engagement with the seat tube and lower frame tube of the bicycle. U.S. Pat. No. 3,741,429, which issued to J. Purcell Jr. et al on June 26, 1973, discloses a bicycle canteen having a rigid structure resembling a motorcycle fuel tank and provided with hose type clamps for securement on a bicycle frame tube. U.S. Pat. No. 4,266,407, which issued to D. Gibson on May 12, 1981, discloses a portable cooler formed from two molded insulating storage container halves, having matching indentations for receiving a number of beverage containers. The halves close over the containers, bringing a previously refrigerated removable cold pack into contact with the enclosed containers. The joint halves are removably received within a fabric carrier adapted for securement on the belt of an individual. U.S. Pat. No. 4,295,345, which issued to L. Atkinson on Oct. 20, 1981, discloses a reusable concave container for carrying and cooling canned beverages having a bottom section containing a plurality of cylindrical compartments and a top section containing corresponding compartments having a slow warming cooling gel in the upper end thereof, and a shoulder strap for carrying the container. U.S. Pat. No. 4,386,721, which issued to K. Shimano on June 7, 1983, discloses a fixture for mounting a water bottle on a bicycle frame which is provided with a pair of skirts which contact lateral side portions of the water bottle.

While the above mentioned devices are directed to portable beverage carriers, none of these devices disclose a portable beverage carrier adapted for mounting on a horizontal top frame tube of a bicYcle which includes a pair of insulated receptacles dimensioned to receive standard beverage containers which are secured at opposite ends of an elongated strap provided with hook and loop fastening members for securement to a bicycle top frame tube. Inasmuch as the art is relatively crowded with respect to these various types of portable beverage carriers, it can be appreciated that there is a continuing need for and interest in improvements to such portable beverage carriers, and in this respect, the present invention addresses this need and interest.

SUMMARY OF THE INVENTION

In view of the foregoing disadvantages inherent in the known types of portable beverage carriers now present in the prior art, the present invention provides an improved portable beverage carrier. As such, the general purpose of the present invention, which will be described subsequently in greater detail, is to provide a new and improved portable beverage carrier which has all the advantages of the prior art portable beverage carriers and none of the disadvantages.

To attain this, representative embodiments of the concepts of the present invention are illustrated in the drawings and make use of a portable beverage carrier, adapted for mounting on a horizontal top frame tube of a bicycle, which includes a pair of insulated receptacles, each dimensioned to receive one or a plurality of standard beverage containers. The insulated receptacles each include a zipper fastened cover. The covers and receptacles are each formed from a fabric material lined with a gel refrigerant encapsulated within a water proof liner. An elongated strap has opposite ends secured to each of the receptacles and first cooperating hook and loop fasteners are provided for securing the strap to a bicycle top frame tube. Second cooperating hook and loop fasteners are provided on facing portions of the opposite ends of the strap for securing the strap around the top bicycle frame tube. The portable beverage carrier allows soft drinks and fruit juices to be carried at an accessible central location near the center of gravity of a bicycle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable beverage carrier which has all the advantages of the prior art portable beverage carriers and none of the disadvantages.

It is another object of the present invention to provide a new and improved portable beverage carrier which may be easily and efficiently manufactured and marketed.

It is a further object of the present invention to provide a new and improved portable beverage carrier which is of a durable and reliable construction.

An even further object of the present invention is to provide a new and improved portable beverage carrier which is susceptible of a low cost of manufacture with regard to both materials and labor, and which accordingly is then susceptible of low prices of sale to the consuming public, thereby making such portable beverage carriers economically available to the buying public.

Still yet another object of the present invention is to provide a new and improved portable beverage carrier which provides in the apparatuses and methods of the prior art some of the advantages thereof, while simultaneously overcoming some of the disadvantages normally associated therewith.

Still another object of the present invention is to provide a new and improved portable beverage carrier adapted for securement to a horizontal top frame tube of a bicycle.

Yet another object of the present invention is to provide a new and improved portable beverage carrier which includes a pair of insulated receptacles lined with a gel refrigerant material and secured at opposite ends of an elongated strip adapted for securement around the horizontal top frame tube of a bicycle.

Even still another object of the present invention is to provide a new and improved portable beverage carrier adapted for transporting and cooling standard beverage containers at a central frame portion of a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
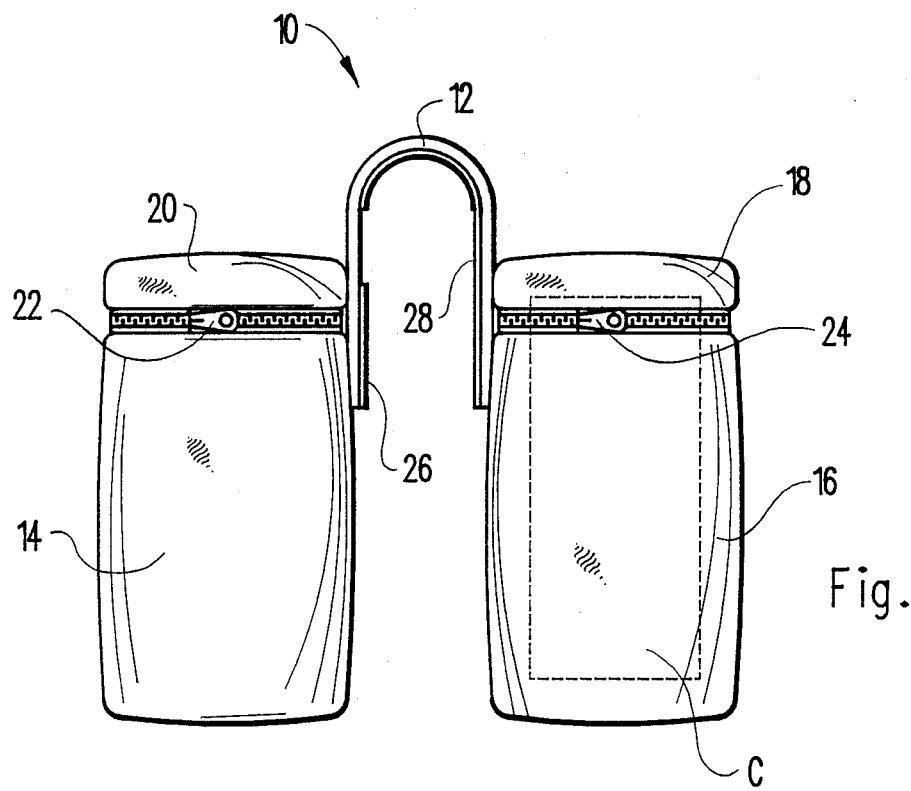
FIG. 1 is an end view illustrating the portable beverage carrier according to a first embodiment of the present invention.

With reference now to the drawings, and in particular to FIG. 1 thereof, a new and improved portable beverage carrier embodying the principles and concepts of the present invention and generally designated by the reference numeral 10 will be described.

More specifically, it will be noted that the first embodiment 10 of the invention includes a pair of insulated receptacles 14 and 16 which are secured at opposite ends of an elongated fabric or plastic strap 12. Selectively openable covers 18 and 20 are provided on the receptacles 16 and 14 and are secured in a closed position by zippers 24 and 22. Each of the receptacles 14 and 16 are dimensioned to receive a single standard sized beverage can C. Alternatively, the receptacles 14 and 16 may each be dimensioned to receive a standard 16 ounce sized beverage container. Thus, the receptacles 14 and 16 may be utilized to carry soft drinks, water and fruit juices stored in standard beverage cans C. Cooperating hook and loop fastening members 26 and 28 are provided on an inner surface of the elongated strap 12 at opposite ends thereof. The cooperating fastening members 26 and 28 are preferably of the type sold under the trademark VELCRO, and are adapted to secure the strap 12 around the top horizontal frame tube of a bicycle.

Figure 2:
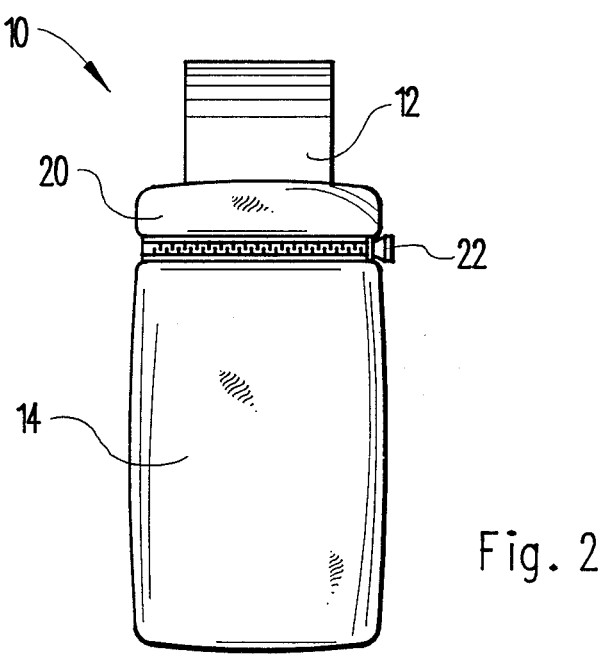
FIG. 2 is a side view of the beverage carrier of FIG. 1.

FIG. 2 illustrates a side view of the portable beverage carrier 10, illustrating the receptacle 14 and reclosable cover 20.

Figure 3:
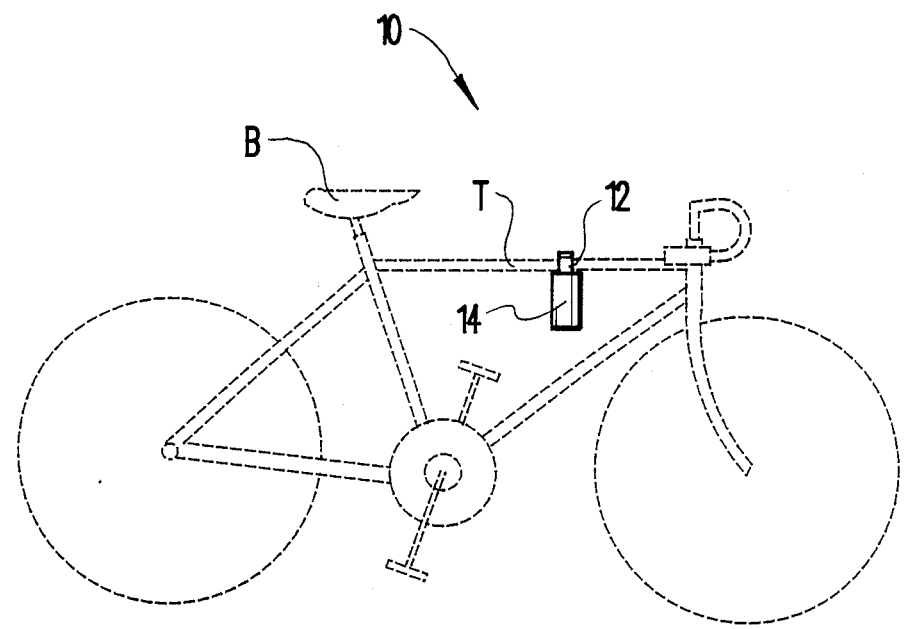
FIG. 3 is side view illustrating the beverage carrier of FIG. 1 installed on a bicycle.

FIG. 3 is a side view which illustrates the mounting of the strap 12 of the beverage carrier 10 over the top horizontal frame tube T of a bicycle B. The carrier 10 may be positioned adjacent a central portion of the bicycle B to provide a weight balance which does not unduly disturb the handling characteristics of the bicycle. Additionally, the symmetric arrangement of the two receptacles at opposite ends of the strap 12 provides a uniformed weight distribution.

Figure 4:
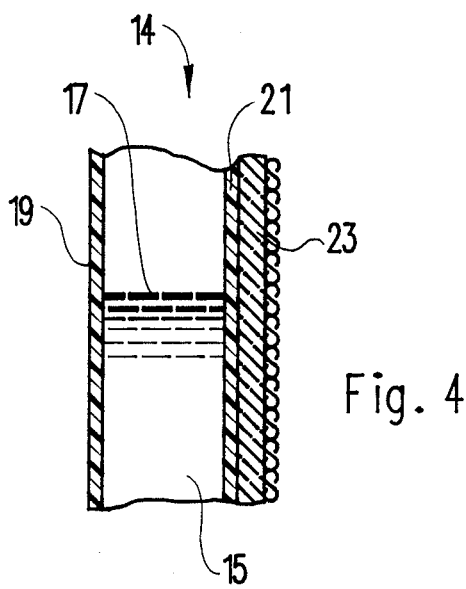
FIG. 4 is a cross sectional detail view illustrating the construction of the beverage carrier of the present invention.

FIG. 4 is a cross sectional detail view which illustrates the construction of the insulated receptacle, for example 14. The receptacle 14 is preferably formed from a flexible canvass or nylon fabric material 23 which is lined with layers of a flexible water proof plastic material 19 and 21 which creates an encapsulated hollow volume area 15 in which a gel refrigerant 17 is received. It should be noted that both the receptacle body portion 14 and the receptacle cover 20 are provided with a similar construction which encapsulates a gel refrigerant. In use, the entire carrier 10 is placed in a home freezer for several hours before use to freeze the gel refrigerant 17. The gel refrigerant 17 is of a conventional composition, and may be of the type sold under the trademark "BLUE ICE". It should be noted that both of the receptacles 14 and 16 and cover members 18 and 20 have a similar construction.

Figure 5:
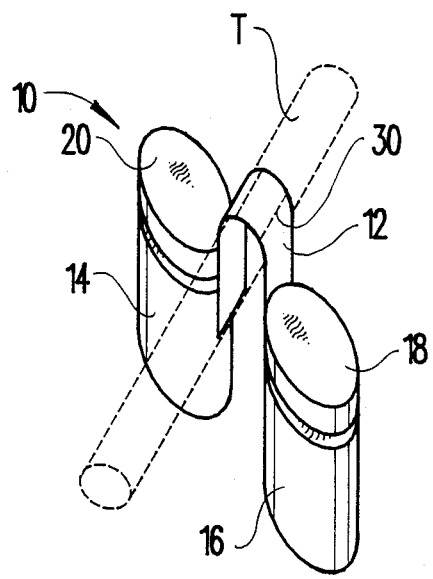
FIG. 5 is a perspective view illustrating the manner of mounting the beverage carrier on a bicycle top frame tube.

FIG. 5 is a perspective detail view which illustrates the mounting of the carrier 10 on the horizontal top frame tube T. The strap 12 is preferably engaged with a small strip of a cooperating hook and loop fastening member 30 which is adhesively secured to the frame tube T. The fastening strip 30 is adapted for complementary engagement with the fastening member 28 secured on the strap 12, as shown in FIG. 1. After the strap 12 is received on the tube T, in a balanced orientation, the fastening member 26 is secured to the lower end portion of the fastening member 28, as shown in FIG. 1 to secure the strap 12 around the tube T. This provides a secured mounting for the beverage carrier 10 on the frame tube T, which prevents the carrier 10 from sliding along the tube T. Additionally, the securement of the strap 12 to the frame tube T by the fastening member 30 serves to retain the carrier 10 in a symmetric orientation after the contents of one of the receptacles 14 has been consumed.

Figure 6:
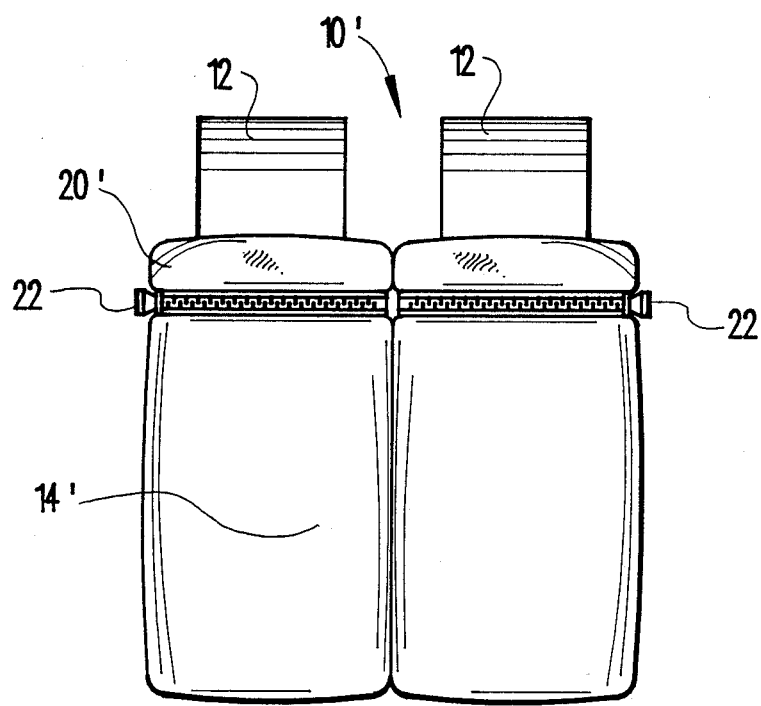
FIG. 6 is a side view illustrating a beverage carrier according to a second embodiment of the invention.

FIG. 6 is a side view which illustrates a portable beverage carrier 10' according to a slightly modified second embodiment of the present invention. The receptacle 14' is dimensioned to receive a pair of standard beverage cans and includes a modified cover 20' secured by zippers 22 to enclose a pair of standard beverage containers. A pair of fastening straps 12 are provided, each provided with cooperating hook and loop fastening members of the type illustrated in FIG. 1.

Figure 7:
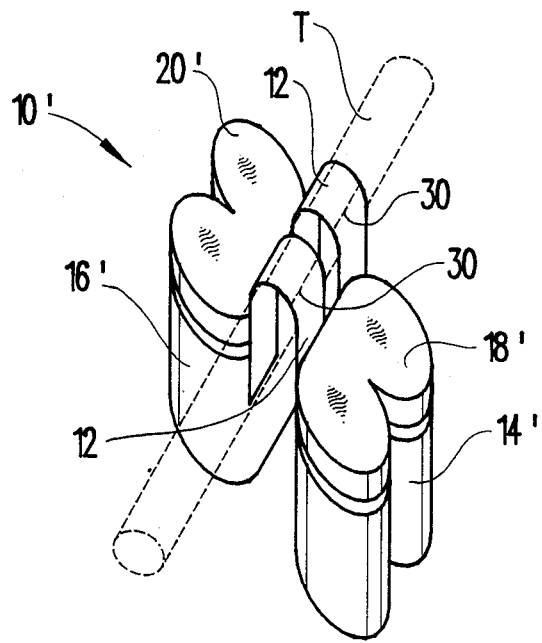
FIG. 7 is a perspective view illustrating the manner of mounting the beverage carrier of FIG. 6 on a bicycle frame tube.

FIG. 7 is a perspective view which illustrates the beverage carrier 10' installed on the horizontal top frame tube T of a bicycle. A pair of spaced hook and loop type fastening strips 30 are secured at an intended mounting location on the frame tube T, for engagement with the cooperating hook and loop fastening members provided on the straps 12. It should be understood that each of the receptacles 14', 16' and covers 18' and 20' are provided with a gel refrigerant lining of the type described and illustrated in FIG. 4.

As may now be understood, the present invention provides a portable beverage carrier which allows standard beverage containers to be cooled and transported at a central location on the top frame tube of a bicycle. In contrast to cooperating bicycle beverage carriers, the carriers 10 and 10' of the present invention allow the beverages to be maintained in a cooled environment and allow the transportation of beverages in their original sealed containers to prevent contamination. Additionally, the beverage carriers 10 and 10' of the present invention may be easily removed from a bicycle, without leaving any bulky wire frames behind.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. In combination with a bicycle having a horizontal top frame tube, a portable beverage carrier adapted for removable mounting on said horizontal top frame tube, comprising:

a pair of insulated receptacles, each dimensioned to receive a standard beverage container;

a selectively openable cover for each of said receptacles;

a zipper for selectively closing each of said covers;

an elongated strap having opposite ends secured to each of said receptacles;

first cooperating hook and loop fastening members on a central portion of said strap and on said bicycle top frame tube for securing said strap to said bicycle top frame tube;

second cooperating hook and loop fastening members on facing portions of said opposite ends of said strap for securing said strap around said bicycle top frame tube;

a gel refrigerant material received in each of said receptacles;

and each of said receptacles and said covers formed from a fabric material lined with a gel refrigerant encapsulated within a water proof liner.

* * * * *